(12) United States Patent
Pappalardo et al.

(10) Patent No.: US 6,892,188 B2
(45) Date of Patent: May 10, 2005

(54) METHOD FOR PROCESSING FUZZY INFERENCES AND CORRESPONDING PROCESSING STRUCTURE

(75) Inventors: Francesco Pappalardo, Catania (IT); Biagio Giacalone, Catania (IT); Carmelo Palano, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 383 days.

(21) Appl. No.: 09/778,669

(22) Filed: Feb. 7, 2001

(65) Prior Publication Data

US 2002/0059149 A1 May 16, 2002

(30) Foreign Application Priority Data

Feb. 8, 2000 (EP) .............................................. 00830082

(51) Int. Cl.[7] .............................. G06F 15/18; G06G 7/00
(52) U.S. Cl. ................................. 706/8; 706/12; 706/14
(58) Field of Search ................................. 706/8, 12, 14

(56) References Cited

U.S. PATENT DOCUMENTS 5,720,005 A    2/1998    Goke et al. .................... 706/1

FOREIGN PATENT DOCUMENTS

| EP | 0445797 A2 | 9/1991 |
|---|---|---|
| EP | 0675431 A1 | 10/1995 |
| EP | 0684549 B1 | 11/2000 |

OTHER PUBLICATIONS

Sinn–Cheng Lin, Dynamic–Link Rule Base in Fuzzy Inference System, Oct. 12–15, 1999, IEEE, 0–7803–5731–0/99, V–244–V 249.*
Lin, "Dynamic–Link Rule Base in Fuzzy Inference System," *IEEE*, pp 244–249, 1999.

\* cited by examiner

*Primary Examiner*—Anthony Knight
*Assistant Examiner*—Joseph P. Hirl
(74) *Attorney, Agent, or Firm*—Lisa K. Jorgenson; Robert Iannucci; Seed IP Law Group PLLC

(57) ABSTRACT

For encoded membership functions used to identify atomic conditions defining antecedents of fuzzy inferences, and also for determining operands of the antecedents, corresponding stores are configured to store already available values of these encoded membership functions and of the operands. At the time of identification of a new value for the quantities, a check is made to see whether this value is already present in the corresponding store. If the outcome of this check is positive for encoded membership functions, pointers by which the encoded fuzzy inferences point to these functions is changed, so that the pointers are redirected towards the membership functions which are already stored. For operands of the antecedents, the check of the corresponding back-up store is carried out preferably based on the corresponding calculation values, the calculation of a new operand being disabled when the corresponding calculation parameters are already present in the corresponding back-up store.

31 Claims, 4 Drawing Sheets

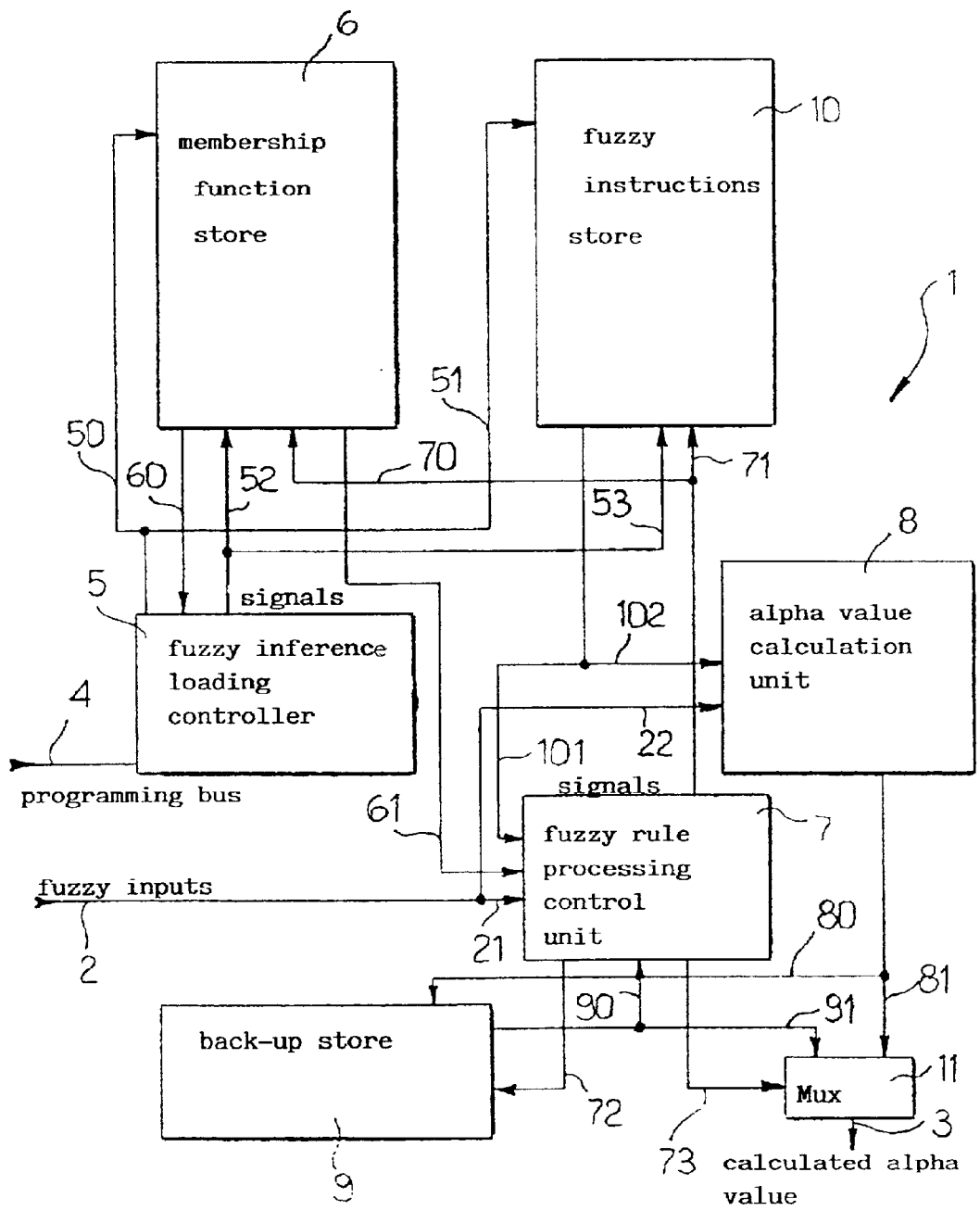

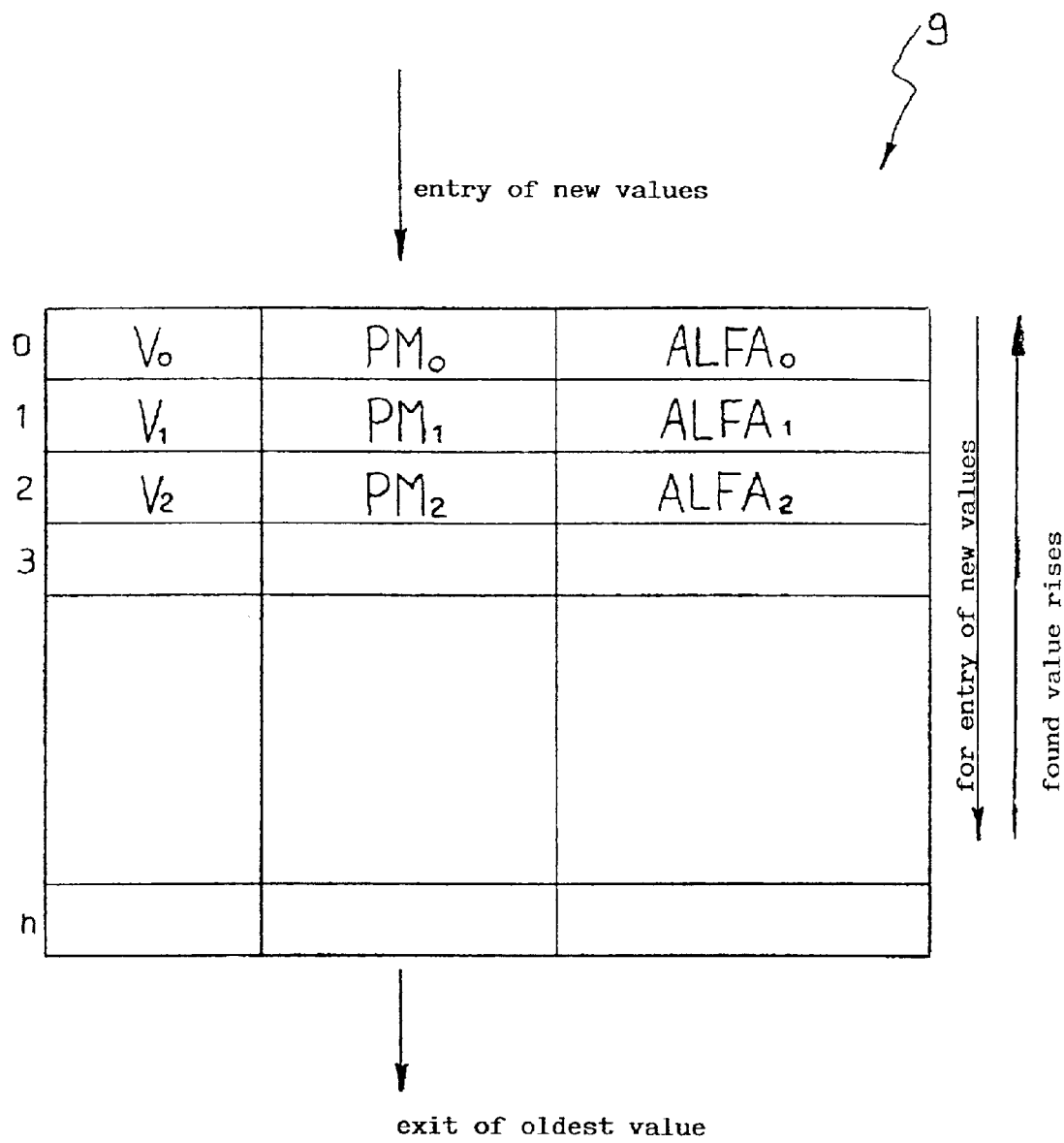

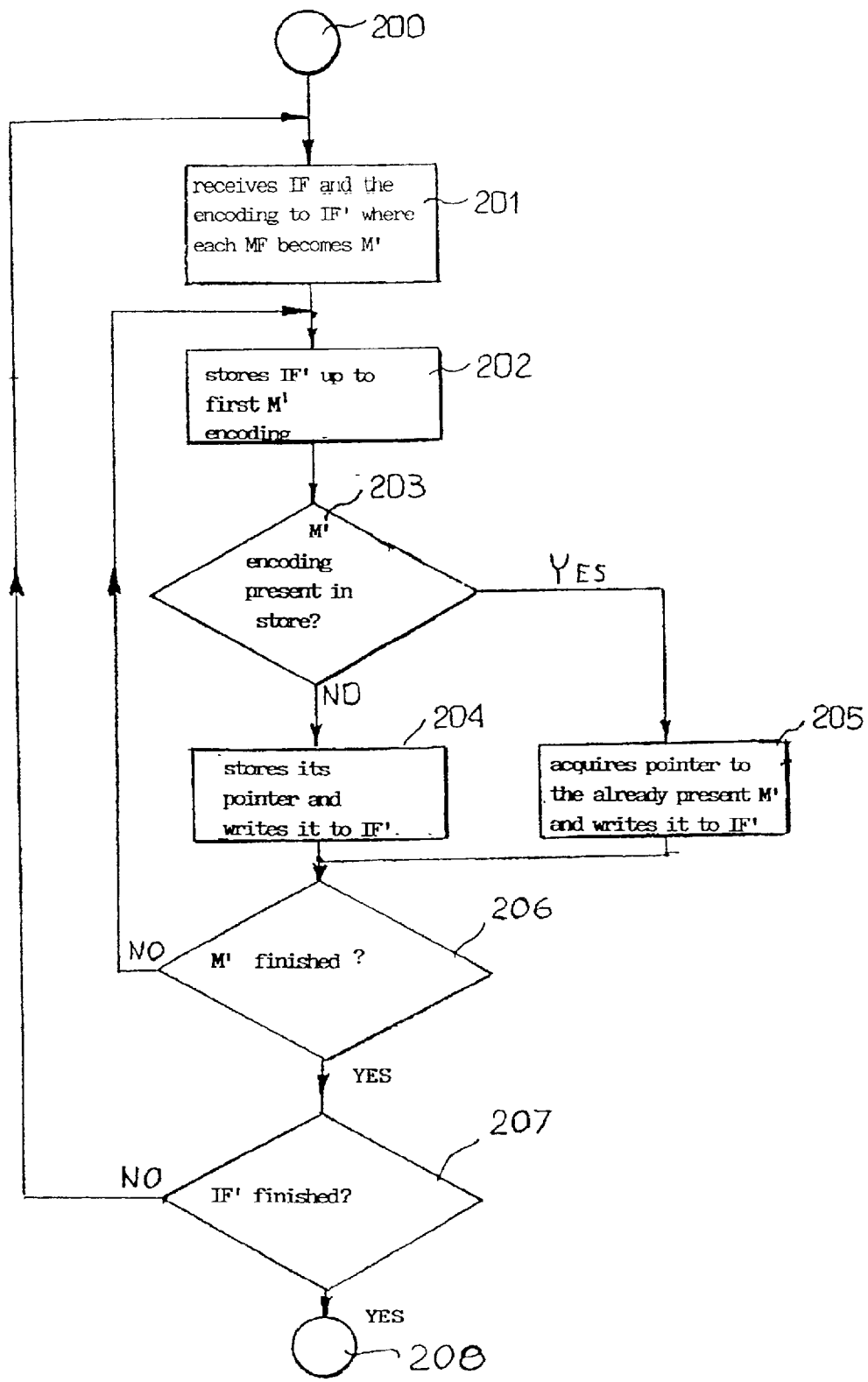

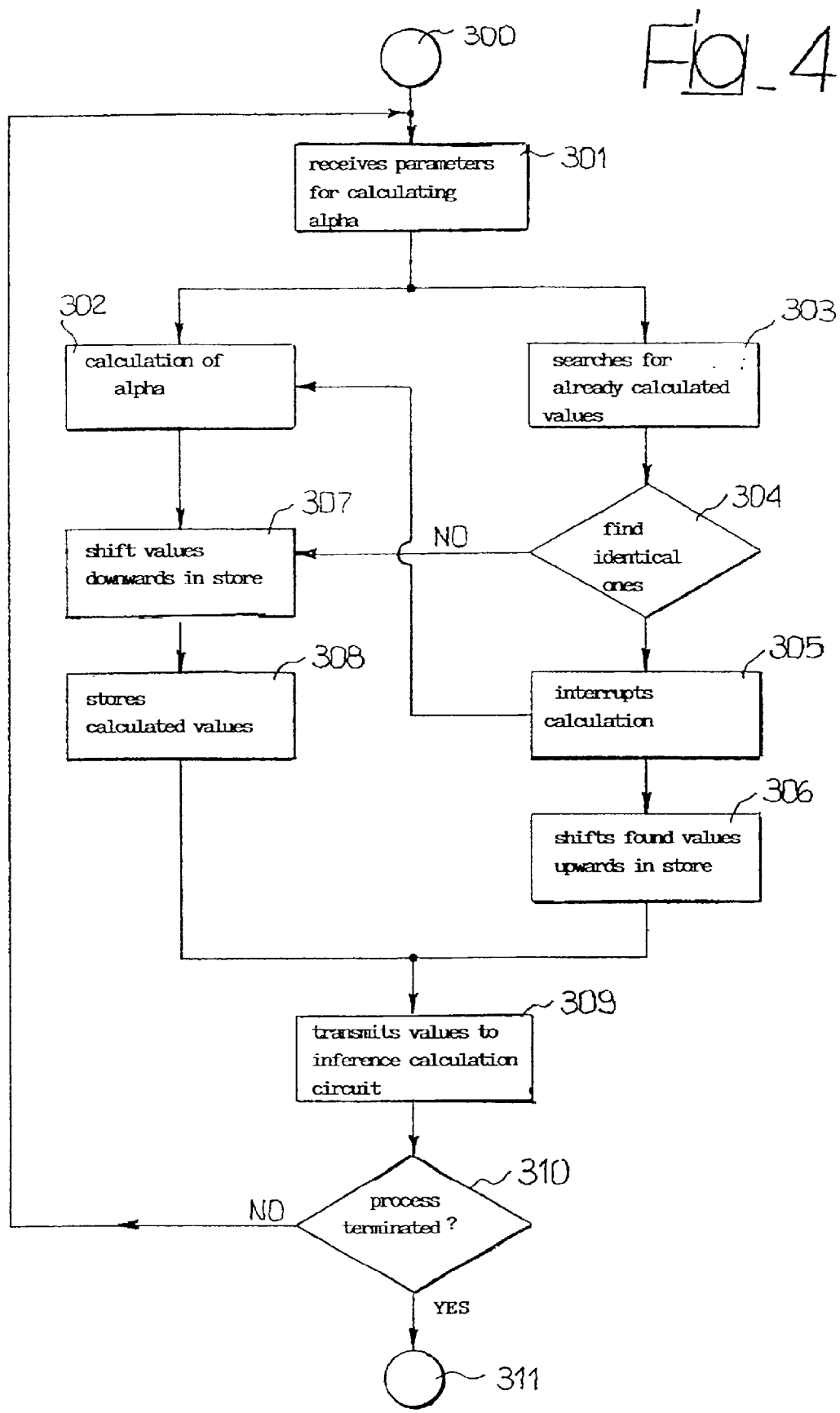
Fig_4

METHOD FOR PROCESSING FUZZY INFERENCES AND CORRESPONDING PROCESSING STRUCTURE

TECHNICAL FIELD

The present invention relates to data processing methods based on fuzzy criteria.

In particular, the invention tackles the problem of optimizing the operations of encoding and computing the fuzzy inference.

BACKGROUND OF THE INVENTION

Processing methods based on fuzzy criteria have become established in recent years because of their capacity to provide solutions for a wide range of control problems by overcoming the intrinsic drawbacks of conventional methods, for example those based on Boolean logic.

This is demonstrated by the extensive literature, including patent documents, relating to these methods.

For example, EP-A-0 675 431 describes a method, usable with an electronic controller operating with logical procedures of the fuzzy type, for storing membership functions of logical variables defined within what is called a discourse universe discretized at a finite number of points. The method stores triangular or trapezoidal membership functions by means of memory words, each comprising a first portion containing an encoding of the vertex of the membership function, a second portion containing an encoding corresponding to the slope of at least one side of the membership function, and a third portion containing an encoding corresponding to the slope of at least one other side of the function.

EP-A-0 684 549 describes a method for parallel processing of a plurality of inference rules organized in fuzzy sets or logical functions of multiple fuzzy sets comprising membership functions defined in a corresponding discourse universe. The inference rules in question are essentially rules of the IF-THEN type with at least one antecedent (preposition) and at least one consequent (implication). Each antecedent comprises at least one term of comparison between membership functions and a plurality of input data, with each term separated by logical operators. The method comprises at least one step of calculating the weight of each term of the antecedent of each fuzzy logic inference rule as the maximum value of the intersection between the set of input data and the corresponding membership functions.

It is also known that fuzzy logics are very suitable for implementation in the form of integrated circuits. In relation to this, it will be useful to refer to the paper by H. Watanabe et al., "A VLSI Fuzzy Logic Controller with Reconfigurable, Cascadable Architecture," published in the IEEE Journal of Solid-State Circuits, vol. 25, no. 2, April 1990, pages 376–381. In particular, this paper describes an inference engine based on a fuzzy logic implemented in CMOS technology.

To summarize (for a more detailed description, reference should be made to the documents cited above), the following elements are essentially present in fuzzy processing:

an input variable, a fuzzy set of the input variable, membership functions contained in the fuzzy sets, logical operators (AND and OR) of the fuzzy type, and a consequent.

As mentioned above in relation to the document EP-A-0 684 549, the fuzzy inference or fuzzy rule used in the fuzzy computation is generally of the type:

IF antecedent THEN consequent where the antecedent part can generally be expanded into an expression of the type ing0 is/not_is MF0 and/or ing1 is/not_is MF1 . . . and/or ingn is/not_is MF_n.

Therefore, the generic fuzzy rule, such as that shown above, consists of an antecedent made up of atomic conditions (such as "ing0 is/not_is MF0," which can be denoted for the sake of brevity simply as "V is/not_is M") related in logical connection by operators such as AND, OR.

The atomic condition expresses the degree to which one element of the discourse universe has membership of a particular fuzzy subset of this universe. The element in question is denoted by the input variable V and the fuzzy subset is characterized by the membership function M.

Additionally, the fuzzy rule is encoded and stored within the structure which is to compute it.

All the methods of storing the fuzzy inference and the corresponding knowledge base associate each input (in a way similar to the procedure used in fuzzy theory) with the set of which it is a member, in other words the corresponding knowledge base which contains all the memberships used by the input variable.

For calculating the fuzzy inference by means of a structure capable of computing it, the discourse universe of the membership functions of all the input variables is translated into a base discourse universe in such a way that the fuzzy inference can be computed. In the case of a calculation structure of the numerical type, the base discourse universe for all the membership functions will be mapped on to a discrete set which extends from 0 to $2^n-1$, where n is the number of bits specified as the size for all the input variables.

SUMMARY OF THE INVENTION

An embodiment of the present invention overcomes two classes of problems which can be encountered in solutions according to the known art.

In the first place, the fields of the discourse universe of the various input variables are virtually always completely different from each other: consequently, the memberships are also formally different. Furthermore, even if they have the same discourse universe, it is not easy to recognize two identical membership functions described in a graphic way. Moreover, for the various input variables, there are frequently memberships which are identical to each other in the base discourse universe; consequently, in the storage within the structure which is to compute them, these memberships are repeated for each input variable with which they are associated.

Secondly, the various atomic conditions of the type "ingk is/not_is MFk," where k=0, . . . , n, suitably calculated, yield values, called alpha, which become the operands of the antecedent part. The atomic conditions are calculated as points of intersection between the input variable ingk and the membership function MFk; this calculation is a time-consuming operation, and occupies a considerable part of the calculation time in the total calculation of the inference.

An embodiment of the present invention therefore provides an improvement by tackling the problem of the redundancy of information due to the storage of the same membership function for different variables or for the same variable, and/or the redundancy associated with the calculation of the operands of the antecedent part of the fuzzy inference or rule.

Essentially, a method according to the invention is based on the recognition of the fact that, as stated above, the fields of the discourse universe of the various input variables are virtually always completely different from each other, and that the memberships suitable for the type of fuzzy operation to be executed have to be described for each variable in the field in which it exists. In order to be used by the calculation unit which computes the inferences, these memberships are remapped from the discourse universe of the variable in a discretized interval suitable for the calculation unit. This operation has to be executed for all the discourse universes of the input variables used in the inferences to be computed. It has been noted that, after the remapping of the discourse universe, many membership functions are found to be identical, both among those of the same input variable and, very frequently, among those of different input variables. Moreover, the value of the variable V (which represents an input of the system) used for calculating the operands of the antecedent part (alpha values) changes, in many cases, at a very low frequency, and therefore the result is that the same value of alpha is calculated cyclically many times.

The method therefore makes it possible to optimize the storage space used, eliminating redundancy and optimizing the inference execution time, by storing the previously calculated alpha values in a back-up store.

BRIEF DESCRIPTION OF THE DRAWINGS

The invention will now be described, purely by way of example and without restrictive intent, with reference to the attached drawings, in which:

FIG. 1 shows, in the form of a block diagram, a processing structure operating according to the invention;

FIG. 2 shows schematically the organization of a store included in the structure of FIG. 1, and FIGS. 3 and 4 show, in the form of flow charts, the execution criteria of specific processing operations within the structure according to the invention.

DETAILED DESCRIPTION OF THE INVENTION

In the attached drawings, the numerical reference 1 indicates the whole of a processing structure designed to receive, on an input line 2, input variables V (fuzzy inputs) used to generate on an output line 3 values (called alpha values) usable as operands for the definition of the antecedent part of a fuzzy inference or rule.

As will be clear to a person skilled in the art, the structure 1 is designed to be incorporated in a more complex processing structure whose overall characteristics are to be considered as known, and therefore do not require a detailed description in this document, particularly as they are not relevant to the understanding and application of the invention.

Also in FIG. 1, the reference 4 indicates the programming bus of the structure 1. The bus 4 leads to a block 5 designed to act as a controller of the loading of the fuzzy inferences. The block 5 is configured in such a way as to implement the algorithm (described in greater detail below with reference to FIG. 3) which recognizes identical membership functions, storing only one of these for each type and recompiling the fuzzy inferences in such a way that the pointers to identical membership functions converge on the single membership function stored in a corresponding store indicated by 6.

The reference 7, on the other hand, indicates a further block or module, acting as a controller of the processing of the fuzzy rules, operating according to the algorithm described in greater detail below with reference to the flow chart of FIG. 4.

The unit 7 is designed to interact both with a unit 8 for calculating the alpha values and with a back-up store 9 organized according to the criteria shown in FIG. 2.

Essentially, the unit 7 searches for any alpha values which have already been calculated and stored in the back-up store 9, while the unit 8 simultaneously calculates the alpha value. If the outcome of the search is negative, the system waits until the unit 8 has calculated the new value designed to be used for the inference and to be stored in the back-up store 9 together with the calculation parameters (in other words the relative input variable and the membership function) which have generated it.

Finally, the references 10 and 11 indicate, respectively, a store for storing fuzzy instructions and a circuit (conceptually similar to a multiplexer) capable of acquiring the alpha value designed to be sent to the output line 3 from the calculation unit 8 or from the back-up store 9, according to a corresponding command received from the unit 7.

FIG. 1 also shows the criteria for interconnection between the various blocks of the diagram.

In particular, the block 5 interacts with the stores 6 and 10, sending corresponding data and command signals by means of the respective lines 50 and 51, on the one hand, and 52 and 53, on the other hand. The block 5 is also capable of reading the content of the store 6 by means of a line 60.

The unit 7 interacts in a double way with the stores 6 and 10 by means of the respective lines 70 and 71 for the transmission of signals, and by means of the respective lines 61 and 101 for the reading function. The reading values of the store 10 are also sent to the calculation unit 8 by means of a line 102, while the line 2 on which the input variables are applied is branched both to the unit 7 and to the calculation unit 8, the respective branches being indicated by the references 21 and 22.

The output lines of the control unit 7 leading to the back-up store 9 and the circuit 11 are indicated respectively by the references 72 and 73, while the references 80 and 81 indicate the outputs of the unit 8 directed, respectively, towards the back-up store 9 and towards the circuit 11.

Finally, the references 90 and 91 indicate, respectively, the outputs of the store 9 directed towards the unit 7 and towards the circuit 11.

Moving on to a detailed examination of the operation of the block 5, it will be noted that, for the calculation of the fuzzy inference by means of a structure capable of computing it, this inference (hereafter denoted "IF") is encoded so that it can be stored within the calculation structure. In the course of this encoding, the discourse universe of the membership functions (MF) of all the input variables is translated into a base discourse universe in such a way as to enable the fuzzy inference to be computed. As stated above, in the case of a calculation structure of the numerical type, the base discourse for all the membership functions will be mapped onto a discrete set extending from 0 to $2^n-1$, where n is the number of bits specified as the size for all the input variables.

After these operations, the encoded fuzzy inference, denoted IF' for the purposes of the present invention, and the encoded membership function, similarly denoted M', are available.

The method used for storage is not relevant to the implementation of the invention. The invention is therefore suitable for implementation with any criterion or method for encoding the fuzzy inferences and the membership functions: it is also clear that the encoded inference IF' must contain the descriptions of the encoded membership functions M' required for the calculation of the operands of the antecedent part (alpha values).

To summarize, the block 5 of FIG. 1 is configured (in a known way) so that it acts on the mechanism by which the fuzzy inferences IF' point to the membership functions M'. In particular, the block 5 is capable of recognizing if an IF' is pointing to an M' identical to another stored previously in the store 6, and, if this recognition takes place, redirecting the pointer to the previously stored M', thus saving storage space.

In the currently preferred embodiment, the block 5 is implemented in the form of a state machine capable of implementing the sequence of steps shown schematically in the flow chart of FIG. 3.

In this diagram, beginning at a start step 200, the block 5 first moves to a step 201 in which it receives from the exterior (typically in serial mode) the fuzzy inference IF in normal format and converts it progressively to the encoded format IF', while similarly changing MF to M', so that it can be stored.

The next step 202 indicates that the aforesaid IF' is stored in the store 10 until the first encoding M' of a membership function is present.

At this point, the operation of the block 5 moves to a selection step 203 at which it checks whether the encoding M' is already present in the store 6.

If the encoding M' is not present in the store (negative outcome of the step 203), the block 5 then proceeds, in a following step 204, to store it, also writing its pointer into the fuzzy inference IF'.

If, on the other hand, the step 203 has a positive outcome (indicating that the encoding M' is identical to another which has already been stored), then in a following step 205 the block 5 operates in such a way that the pointer to the previously stored M' is acquired, and is written into the fuzzy inference IF'. Thus the two membership functions are effectively combined with each other and stored once only.

The process described above is repeated for all the M' of each IF' and for all the fuzzy inferences IF' to be stored, as shown by the selection step indicated by 206.

A negative outcome of this step, indicating that there are still M' to be processed for a given IF', causes the system to return to a point upstream of the block 202. A positive outcome (end of the M') causes a move towards the step 207.

This step is a selection step, a negative outcome of which, indicating that there are still fuzzy inferences IF' to be stored, returns the operation of the block 5 to a point upstream of the step 201. A positive outcome of the step 207, however, indicates that the fuzzy inferences IF' are finite, causing the operation of the block 5 to move towards a stop step 208.

On the other hand, where the operation of the unit 7 is concerned, and in particular its interaction with the back-up store 9, the processing structure 1 saves time in the calculation of the fuzzy inference and consequently to save resources so that they can be used for other processing functions carried out in the calculation structure. All of this is done by making use of the fact that the value of the variable V (in other words an input of the system) used for the calculation of the operands by the antecedent part of the fuzzy inference or rule (these operands being simply denoted the alpha values in the following text), usually changes at a very low frequency, compared with the typical operating speeds of the processing structure 1.

Essentially, the unit 7 determines an alpha value by searching for the value in the back-up store 9. If it does not find it, it completes the calculation of the alpha value, making it available for the calculation of the total inference, and also storing it in the store 9.

The store 9 is organized according to the criteria shown more clearly in FIG. 2, in other words as a push-down store loaded from the top and emptied from the bottom. In particular, in this store the alpha values (and the corresponding values used for their calculation, in other words the input variable V and the pointer to the membership function M', called PM) are stored from the top and move downwards as shown in FIG. 2. The values found within the store (for which a new calculation is not necessary) are made to rise to the uppermost position (the entry point of the new calculated values) while, as the store is filled, the values stored at a lower point are lost.

The unit 7 can also be made advantageously in the form of a state machine capable of implementing the sequence of steps shown in FIG. 4.

Beginning at a starting step 300, at step 301 the unit 7 receives the parameters for the calculation of alpha, in other words the input variable V and the pointer PM.

At this point, the system moves in parallel towards two steps indicated by 302 and 303 respectively.

In the step 302, the alpha value corresponding to the input parameters received in the step 301 is calculated in the unit 8.

Simultaneously, in the step 303 the unit 7 searches for any corresponding previously calculated value in the back-up store 9.

This is preferably done by means of the values V and PM. As has been stated, the calculated values of alpha ($ALFA_1$, $ALFA_2$, etc., of FIG. 2), together with the corresponding parameters used for the calculation (these parameters being $V_0$, $V_1$, etc. and $PM_0$, $PM_1$, etc., as shown in FIG. 2), are stored in the back-up store 9. The search is then carried out, and a check is made as to whether the values V and PM received in the step 301 are equal to corresponding values already present in the first part of the back-up store 9.

The step 304 is essentially a selection step corresponding to the checking of the outcome of the search conducted in the back-up store 9.

The positive outcome of the step 304 corresponds to the fact that the search has resulted in the finding, in the store 9, of a previously calculated value of alpha using parameters corresponding to the parameters V and PM received at the input. In this case, the operation of the unit 7 moves to a step 305 in which, on the one hand, the unit 7 interrupts the calculation of the alpha which has been started in the unit 8 (this calculation no longer being necessary since the aforesaid value is already available in the store 9); on the other hand, the unit 7 acts on the back-up store 9 in such a way that, in a step indicated by 306, the line of the store containing the found value is made to move up to the head, in other words to the uppermost position of the store 9.

If the search does not produce any useful result (negative outcome of the step 304), the operation of the unit 7 moves to a point downstream of the step 302 of calculation of the alpha, therefore completing the calculation of the new value of alpha corresponding to the input parameters. In a step 307, the content of the store 9 is then made to move downwards by one line (reference should be made again to the schematic illustration in FIG. 2), making available at the head of the store a new line in which the set of three values consisting of the parameters V and PM and the alpha value which has just been calculated from these parameters in the step 302 is stored in a step 308.

The operation of the unit 7 finally moves from either step 306 or step 308 to a further step 309, in which the value of alpha made available (by calculation or by the marking of the back-up store 9) is sent to the circuit 11 to be sent along the line 3 towards the module (not illustrated) which calculates the inference.

As in the case of the step 206 of FIG. 3, the step 310 of FIG. 4 is simply a selection step designed to check whether the current process has terminated. If the process has not terminated, for example because new input parameters have been received in the meantime, the operation of the unit 7 again moves to the step 301.

If the process has been completed, however, there is a move to a stop step 311. The latter can advantageously be configured (in a known way) as a step of waiting for the reception of new parameters for the calculation of the alpha.

Naturally, provided that the principle of the invention remains unchanged, the details of construction and the forms of embodiment can be varied widely from what has been described and illustrated, without thereby departing from the scope of the present invention as defined by the following claims.

What is claimed is:

1. A computer-implemented method for controlling the operation of a computer structure for processing fuzzy inferences comprising corresponding antecedents defined by atomic conditions identified from membership functions, the atomic conditions also identifying corresponding operands of the antecedents, the computer structure including a computer store, the method comprising the operations of:

organizing, for a quantity included among the membership functions and the operands, the computer store for storing values of the quantity which are already available;

checking, using the computer structure, at a time of identification of a new value of the quantity, whether the new value is already present in the computer store; and preventing, in response to the checking, redundant storage of the new value of the quantity in the computer structure for processing fuzzy inferences.

2. The method according to claim 1, further comprising the operation of identifying the new value with a corresponding value already present in the corresponding store.

3. The method according to claim 1, further comprising, in relation to the membership functions, the operations of:

encoding the fuzzy inferences and corresponding membership functions;

establishing a pointing mechanism from the encoded fuzzy inferences to the corresponding encoded membership functions;

checking whether a given encoded fuzzy inference points to an encoded membership function which is already present in the corresponding store; and acting on the pointing mechanism according to whether the encoded membership function is already present in the corresponding store.

4. The method according to claim 3, further comprising, if an outcome of the checking is positive, the operation of redirecting the pointer of the given encoded fuzzy inference towards the encoded membership function already present in the corresponding store.

5. The method according to claim 3, further comprising, if an outcome of the checking is negative, storing the corresponding encoded membership function and writing its pointer into the given encoded fuzzy inference.

6. The method according to claim 3 wherein a given one of the encoded fuzzy inferences corresponds to a plurality of encoded membership functions and the operation of acting on the pointing mechanism is carried out for all the encoded membership functions of the given encoded fuzzy inference and for all the encoded fuzzy inferences to be stored.

7. The method according to claim 1, further comprising, in relation to the operands, the operations of:

providing, in the structure, a function for calculating the operands from corresponding calculation parameters; and disabling, at least partially, the calculation function when it is found that a corresponding operand value is already present in the corresponding store.

8. The method according to claim 1, further comprising, in relation to the operands, the operations of:

providing, in the structure, a function for calculating the operands from corresponding calculation parameters;

configuring the corresponding store for the storage of the operands and of the corresponding calculation parameters; and scanning the corresponding store on the basis of the corresponding calculation parameters, identifying a corresponding operand value already present in the corresponding store on the basis of corresponding calculation parameters already present in the corresponding store.

9. The method according to claim 8 wherein the corresponding calculation parameters are an input variable of the structure and a pointer to the corresponding membership function.

10. The method according to claim 1, further comprising, in relation to the operands, the operation of organizing the corresponding store in the form of a stack organized for an ordered loading of new values of the operands from an uppermost position with downward shifting of the values already present in the corresponding store.

11. The method according to claim 10, characterized in that it comprises, when it is found that the new value of one of the operands is already present in the corresponding store, the operation of moving the new value which is already present to the uppermost position of the corresponding store.

12. A computer structure for processing fuzzy inferences comprising corresponding antecedents defined by atomic conditions identified from membership functions, the atomic conditions also identifying corresponding operands of the antecedents, the computer structure comprising:

a computer store for storing already-available values of a quantity included among the membership functions and the operands; and a processing unit configured in order to check, at a time of identification of a new value of the quantity, whether the new value is already present in the corresponding store, and prevent redundant storage of the new value in the computer structure for processing fuzzy inferences.

13. The structure according to claim 12, wherein the processing unit identifies the new value of the quantity with a corresponding value already present in the corresponding store.

14. The structure according to claim 12, further comprising a processing unit operating in relation to the membership functions and configured to:
  encode the fuzzy inferences and corresponding membership functions;
  establish a mechanism for pointing from the encoded fuzzy inferences to the corresponding encoded membership functions;
  check whether a given encoded fuzzy inference points to an encoded membership function already present in the corresponding store; and
  act on the pointing mechanism according to whether the membership function is already present in the corresponding store.

15. The structure according to claim 14, wherein the processing unit, operating in relation to the membership functions, redirects, if the outcome of the check is positive, the pointer of the given encoded fuzzy inference towards the encoded membership function already present in the corresponding store.

16. The structure according to claim 14 wherein the processing unit, operating in relation to the membership functions, carries out, if the outcome of the check is negative, the storing of the corresponding encoded membership function, writing its pointer into the given encoded fuzzy inference.

17. The structure according to claim 14 wherein a given one of the encoded fuzzy inferences corresponds to a plurality of encoded membership functions and the processing unit is configured to act on the pointing mechanism for all the encoded membership functions of the given encoded fuzzy inference and for all the encoded fuzzy inferences to be stored.

18. The structure according to claim 12 wherein the processing unit is structured to execute a function of calculating the operands from corresponding calculation parameters, and also a disabling function to disable, at least partially, the calculation function when it is found that a corresponding operand value is already present in the corresponding store.

19. The structure according to claim 12 wherein the processing unit is structured to calculate the operands from corresponding calculation parameters, wherein:
  the corresponding store is configured to store the operands and the corresponding calculation parameters, and
  the processing unit, operating in relation to the operands, scans the corresponding store on the basis of the corresponding calculation parameters, identifying a corresponding operand value as already present in the corresponding store on the basis of corresponding calculation parameters already present in the corresponding store.

20. The structure according to claim 19, wherein the processing unit uses, as the corresponding calculation parameters, an input variable of the structure and a pointer to the corresponding membership function.

21. The structure according to claim 12 wherein the corresponding store is organized as a stack, configured for an ordered loading of the new values of the operands from an uppermost position with downward shifting of the values of the operands already present in the corresponding store.

22. The structure according to claim 21, wherein the processing unit acts on the corresponding store, when it is found that a corresponding operand value is already present in the corresponding store, to move the operand value, which is already present to the uppermost position of the corresponding store.

23. A processing structure for processing an input fuzzy inference that includes plural corresponding input membership functions, the processing structure comprising:
  a membership function storage device for storing encoded membership functions; and
  fuzzy inference encoding means, coupled to the membership function storage device, for encoding the input fuzzy inference into an encoded fuzzy inference, including for each of the input membership functions:
  encoding the input membership function into an encoded input membership function;
  comparing the encoded input membership function to the stored encoded membership function;
  if a stored encoded membership function is found to match the encoded input membership function, then storing with the encoded fuzzy inference a pointer to the matching stored encoded membership function; and
  if none of the stored encoded membership functions is found to match the encoded input membership function, then storing the encoded input membership function in the membership function storage device and storing with the encoded fuzzy inference a pointer to the stored encoded input membership function.

24. The structure according to claim 23, further comprising a fuzzy inference storage unit coupled to the fuzzy inference encoding means and structured to store the encoded fuzzy inference.

25. The structure according to claim 23, further comprising:
  an alpha storage device for storing alpha values; and
  fuzzy inference control means, coupled to the alpha storage device and to the membership function storage device, for receiving a fuzzy input, for receiving from the membership function storage device an encoded membership function corresponding to the fuzzy input, and determining whether the alpha storage device stores an alpha value corresponding to the fuzzy input and corresponding encoded membership function.

26. The structure according to claim 25 wherein the fuzzy inference control means includes output means wherein if a stored alpha value is found to correspond to the fuzzy input and corresponding membership function, the output means outputs the corresponding stored alpha value.

27. The structure according to claim 25, further comprising:
  alpha calculation means for calculating an alpha value corresponding to the fuzzy input and corresponding encoded membership function wherein the fuzzy inference control means includes means for interrupting the calculation of the alpha value by the alpha calculation means if a stored alpha value is found to correspond to the fuzzy input and corresponding membership function.

28. The structure according to claim 25 wherein the alpha storage device is organized as a stack of alpha values with each alpha value in the stack corresponding to a respective fuzzy input and a respective pointer to an encoded membership function stored in the membership function storage device.

29. A computer structure for processing a fuzzy input, comprising:
  an alpha storage device for storing alpha values;
  alpha calculation means for receiving the fuzzy input and a membership function corresponding to the fuzzy input and calculating an alpha value corresponding to the fuzzy input and corresponding membership function; and fuzzy inference control means, coupled to the alpha storage device and alpha calculation means, for:

receiving the fuzzy input and corresponding membership function;

determining whether the alpha storage device stores an alpha value corresponding to the fuzzy input and corresponding membership function; and if a stored alpha value is found to correspond to the fuzzy input and corresponding membership function, outputting the corresponding stored alpha value.

30. The structure according to claim 29 wherein the fuzzy inference control means includes means for interrupting the calculation of an alpha value by the alpha calculation means if a stored alpha value is found to correspond to the fuzzy input and corresponding membership function and the alpha calculation means includes means for outputting the calculated alpha value if not interrupted by the fuzzy inference control means.

31. The structure according to claim 29, further comprising a membership function storage device that stores a plurality of membership functions wherein the alpha storage device is organized as a stack of alpha values with each alpha value in the stack corresponding to a respective fuzzy input and a respective pointer to a membership function stored in the membership function storage device.

\* \* \* \* \*